Oct. 23, 1962     D. J. ABEL     3,060,295

MOTION CONVERTERS

Filed Aug. 11, 1960     2 Sheets-Sheet 1

INVENTOR.
BY Donald J. Abel

INVENTOR.
BY Donald J. Abel

United States Patent Office 3,060,295
Patented Oct. 23, 1962

1

3,060,295
MOTION CONVERTERS
Donald J. Abel, 43 Susan Ave., Midland Park, N.J.
Filed Aug. 11, 1960, Ser. No. 49,084
4 Claims. (Cl. 200—153)

The invention relates in general to motion converter devices and more particularly to rotary devices that move linear elements.

An object of the invention is to provide a high speed mechanical motion converter.

Another object of the invention is to provide a motion converter with low friction.

Another object of the invention is to provide a motion converter with rolling action throughout its operation.

Another object of the invention is to provide an epicycloid curve for the actuating point to follow, so at the moment of actuation a substantially linear movement results from a rotary input motion.

Another object of the invention is to provide an epicycloid motion resulting in a zero relative velocity at the contact surfaces during actuation, from a constant input motion.

Another object of the invention is to provide a substantially constant loading force from the actuator to the plunger.

Another object of the invention is to provide a mechanical motion converter with substantial accuracy from the point of actuation when rotating in one direction to the same point when the actuator is rotated in the opposite direction.

Another object of the invention is to provide a mechanical motion converter with substantial accuracy from any one actuating point to any other point of actuation.

Another object of the invention is to provide a geared assembly in which portions of one gear act as an actuator for elements located by another gear.

In the attainment of aforesaid objectives, subject motion converter is made in two embodiments. In each embodiment the actuation and locating is accomplished with gears. The embodiments are different in the plunger assemblies and their associated parts.

A fuller understanding of the invention may be had by referring to the following descriptions and claims, taken in conjunction with the accompanying drawings in which:

Figure 1:
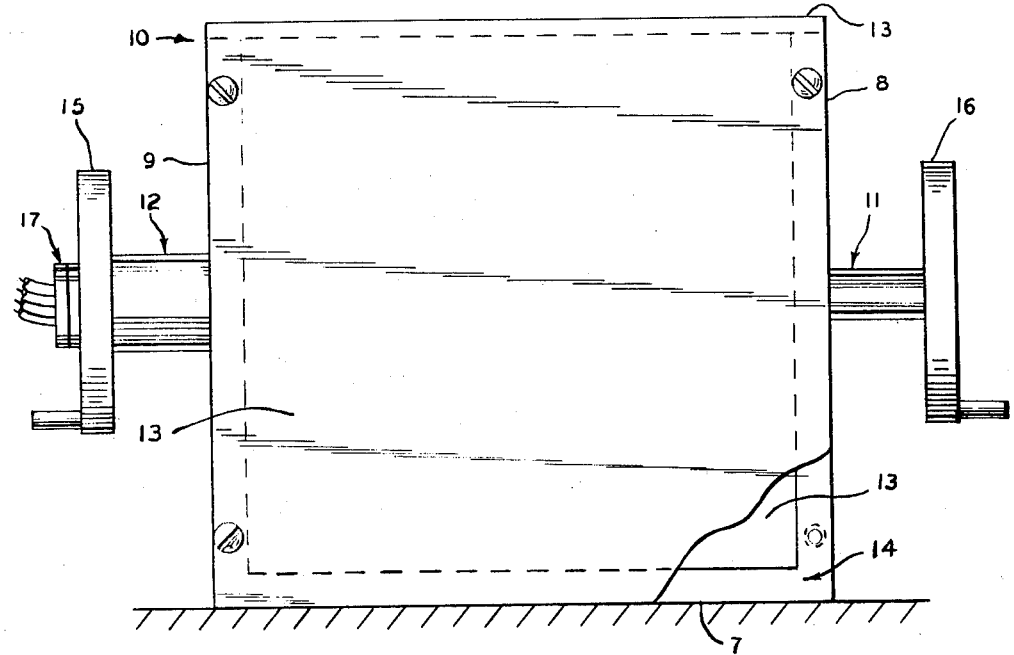
FIGURE 1 shows a housing assembly with its cover partially removed in which the invention may be incorporated.

With reference to the drawing the invention is illustrated as being incorporated in a housing assembly shown in FIGURE 1. This housing assembly 10 is a rectangular box consisting of a U-shaped base 14 and a U-shaped cover 13. The cover is attached to the base by any known means that will permit removal. Mounted in the center of the ends of the U-shaped base 14 are two shafts. Hollow shaft 12 extends through side 9 of U-shaped base 14 with hand wheel 15 attached by any known means that will permit removal. Through the hollow shaft 12 are the input and output conductor assembly 17 connected internally to the actuated device. A drive shaft 11 extends through side 8 of U-shaped base 14 with hand wheel 16 attached by any known means that will permit removal. Housing assembly 10 may be attached to any suitable mounting surface at side 7 of U-shaped base 14 by any known means that will permit removal as shown in FIGURE 1.

Figure 2:
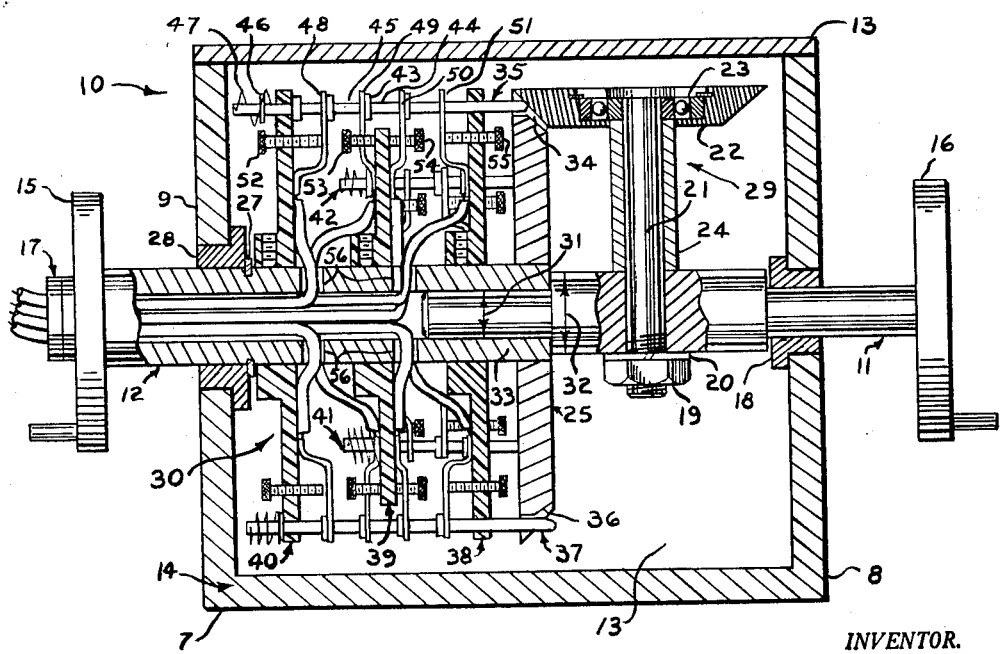
FIGURE 2 is a longitudinal cross-sectional view of FIGURE 1 and shows one embodiment of the invention incorporating an axial electrical switching device.

FIGURE 2 incorporates an actuator assembly 29 with an axial electrical switching device 30 in the housing assembly 10. Drive shaft 11 is held rotatable at one end in side 8 of U-shaped base 14 by a bushing 18. The other end is held rotatable in diameter 31 of hollow shaft 12. Shouldered diameter 32 of drive shaft 11 establishes longitudinal location of actuator assembly 29. Actuating gear 22 is held rotatable on shaft 21 by a retaining ring through roller bearing 23 and located radially from drive shaft 11 by locating spacer 24. Shaft 21 is held fixed but removable to drive shaft 11 at diameter 32 by nut 19 and washer 20 attached to its threaded end. Locating gear 25 is fixed by any known means to the inner end 33 of hollow shaft 12. Hollow shaft 12 is supported rotatable at one end through diameter 31 by drive shaft 11 and by bushing 28 in side 9 of U-shaped base 14 at the other end. Hollow shaft 12 is prevented from longitudinal movement by retaining ring 27 and diameter 32 of drive shaft 11. Intermediate two teeth on locating gear 25 slot 34 is machined just wide enough to pass plunger assembly 35. Intermediate two other teeth on locating gear 25 slot 36 is machined just wide enough to pass plunger assembly 37. Other positions may be machined in locating gear 25 to fulfill various requirements such as plunger assemblies 41 and 42. Fixed to hollow shaft 12 but movable relative to locating gear 25 and each other are conductor board assemblies 38, 39, and 40. Plunger assembly 35 consists of the following sections: contacts 43, conductive segments 44, non-conductive segments 45 and shoulder 46. The plunger assembly 35 is held relative to slot 34 in locating gear 25 by conductor board assemblies 40 and 38. Tension spring 47 maintains plunger assembly 35 forward in slot 34 to a position determined by shoulder 46 against conductor board assembly 40 until actuation. All plunger assemblies are constructed in a similar manner. Stationary contacts 48 on conductor board assembly 40, 49 and 50 on conductor board assembly 39, and 51 on conductor board assembly 38 are adjustable by screws 52, 53, 54 and 55 relative to contacts 43 on plunger assembly 35. Screw 52 is threaded through conductor board assembly 40 and bears against stationary contact 48. Screw 53 is threaded through stationary contact 49 and bears against conductor board assembly 39. All other stationary contact assemblies are constructed in a similar manner. All stationary contacts are insulated from ground and fastened by any known means to the conductor boards. A conductor insulated from ground is attached to each stationary contact and passed along the boards then parallel to hollow shaft 12, through holes 56 into diameter 31 and out through conductor assembly 17.

Figure 3:
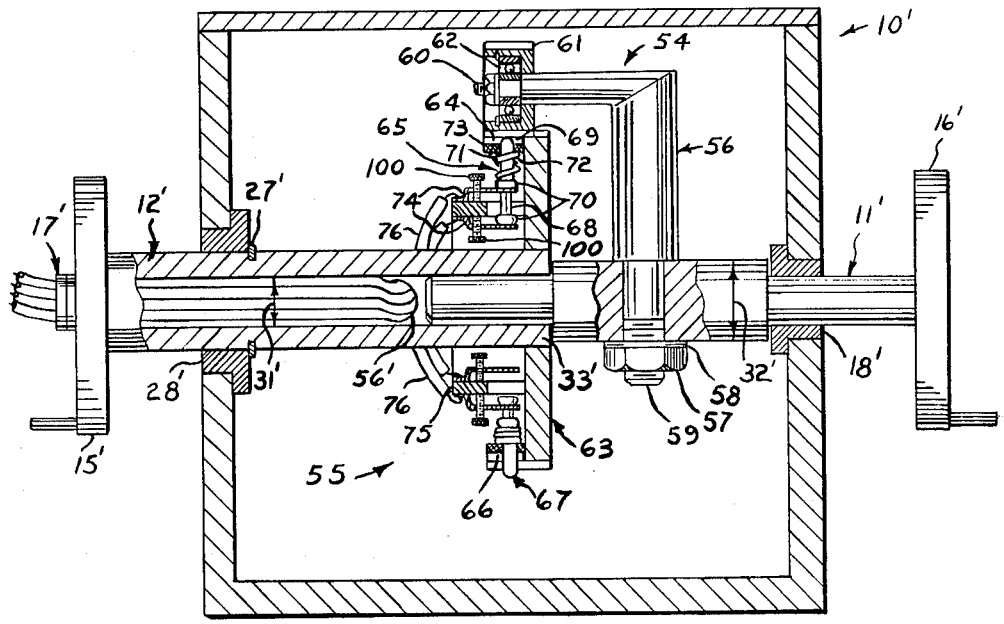
FIGURE 3 is a longitudinal cross-sectional view of FIGURE 1 and shows a second embodiment of the invention incorporating a radial electrical switching device.

A second embodiment of the invention shown in FIGURE 3 incorporated in housing assembly 10' consists of actuator assembly 54 with a radially mounted linear electrical switching device 55. Hollow shaft 12' is mounted in a similar manner as shown in FIGURE 2 through bearing 28' at one end with handwheel 15' attached and integral with drive shaft 11' at diameter 31' on end 33' of hollow shaft 12'. Hollow shaft 12' is located longitudinally by retaining ring 27'. Drive shaft 11' with handwheel 16' mounted at one end through bearing 18' and in hollow shaft diameter 31' at the opposite end has diameter 32' for longitudinal location. Actuator assembly 54 has right angle shaft 56 mounted fixed but removable to drive shaft 11' at diameter 32' by nut 57 and washer 58 assembled to threaded end 59 of right angle shaft 56. At end 60 of right angle shaft 56 held on by a nut, washer, and retaining ring; and rotatable through bearing 62 is actuating gear 61. Fixed in any known manner to hollow shaft end 33' is locating gear 63. Intermediate two teeth on locating gear 63 is slot 64 machined just wide enough to pass plunger assembly 65. Intermediate two different teeth on locating gear 63 is slot 66 just wide enough to pass plunger assembly 67. For various positional requirements more plungers can be mounted with similar construction. Plunger assembly 65 consists of conductive segment 68, non-conductive segment 69, contacts 70, and locating flange 71. Tension spring 72 is mounted between the plunger assembly 65 and annular guide ring 73. Stationary contacts 74 are fixed to annular conductor board 75 but adjustable by screws 100 threaded through stationary contact 74 against annular conductor board 75. All plunger and contact assemblies are constructed in a similar manner. Conductive wires 76 insulated from ground pass from the ends of the stationary contacts along hollow shaft 12' in hole 56' through diameter 31' and out conductor assembly 17'.

The arrangement of the invention and its embodiments shown in FIGURES 2 and 3 when part of an overall system may be such as to produce an optimum system design. The drive shaft 11 is free to rotate in any known manner including constant and variable speeds with reversing, continuous or sectoring motions. Shaft 21 being fixed to drive shaft 11 swings with a motion that moves the center of actuating gear 22 in a circular path. Being in mesh with locating gear 25, actuating gear 22 rotates about shaft 21 and moves along the pitch diameter of locating gear 25. Plunger assembly 35 extending through slot 34 is moved by the upper tooth portion of the actuating gear 22 as it rotates over the slot. The rotary motion of drive shaft 11 is therefore converted to a linear motion of plunger assembly 35. Numerous plungers assembled to locating gear 25 in a similar manner to plunger assembly 35 result in a number of linear motions from the one drive shaft 11 spaced at controllable time intervals. These linear motions may be utilized in opening or closing electrical circuits, hydraulic pumping, pneumatic pumping, and moving any linear mechanical mechanism. Being a dynamic mechanism relative speed variations may be obtained by moving hollow shaft 12 whose degree of motion will be determined by conductor assembly 17. Hollow shaft 12 in moving will rotate locating gear 25 and its plunger assemblies relative to actuating gear 22. This can increase or decrease the time of actuation, and intervals between actuation positions. The gears may be of any well known design that will permit the described function.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. A rotary motion convertor comprising an actuating gear, a locating gear in operable engagement with the actuating gear, a support for the gears, the locating gear having at least one opening formed herein between successive teeth, and a plunger disposed in the opening, the plunger being directed under tension toward the teeth of the actuating gear.

2. A rotary motion converter, requiring external support, comprising, in combination, two rotatable shafts, a planetary actuating gear driven by one shaft; a locating gear having openings intermediate teeth and in mesh with the actuating gear is attached to the second shaft; plungers forcefully positioned mounted intermediate teeth of the locating gear are moved in a linear direction by the teeth of said actuating gear during rotation, and means for transmitting the effect of said motion to external receivers.

3. A rotary motion converter, requiring external support, comprising, in combination, a rotatable drive shaft, arm means attached to the drive shaft, an actuating bevel gear mounted rotatable on said arm, a locating bevel gear having openings intermediate teeth and in mesh with the actuating bevel gear, springs, plungers positioned by said springs mounted intermediate the teeth of said locating bevel gear moved in a linear direction by the teeth of said actuating bevel gear during rotation, segments electrically conductive, segments having no electrical conduction together with said conducting segments comprising one end of the plunger to open and close electrical circuits, adjustable stationary contact means for making contact with the plunger segments to open and close electrical circuits, conductor board means for holding said plunger and adjustable stationary contacts, electrical conductors connected to said adjustable stationary contacts and mounted on said conductor boards running externally from the converter to electrical terminals to be energized by a source of current, a rotatable hollow shaft for locating conductor boards and attachment of said locating bevel gear.

4. A rotary motion converter, requiring external support, comprising, in combination, a rotatable drive shaft, arm means attached to the drive shaft, an actuating spur gear mounted rotatable on said arm, a locating spur gear having openings intermediate and beyond the base of the teeth is in mesh with the actuating spur gear, springs, radial plungers positioned by said springs mounted intermediate the teeth of said locating spur gear moved in a linear direction by the teeth of said actuating spur gear during rotation, segments electrically conductive, segments having no electrical conduction together with said conductive segments comprising one end of the plunger to open and close electrical circuits, adjustable stationary contact means for making contact with the plunger segments to open and close electrical circuits, guide ring means for holding said plunger attached to the locating spur gear, conductor board means for holding adjustable stationary contacts attached to the locating spur gear, conductors connected to said adjustable stationary contacts and mounted on said conductor board running externally from the invention to electrical terminals to be energized by a source of current, rotatable hollow shaft for attachment of said locating spur gear.

References Cited in the file of this patent

UNITED STATES PATENTS

| | | |
|---|---|---|
| 1,497,582 | Petersen | June 10, 1924 |
| 1,951,424 | Lewis | Mar. 20, 1934 |
| 2,232,971 | Schmied | Feb. 25, 1941 |
| 2,234,683 | Otterbacher | Mar. 11, 1941 |
| 2,344,517 | Schnell | Mar. 21, 1944 |
| 2,603,731 | Weiss et al. | July 15, 1952 |
| 2,648,357 | Werkland | Aug. 11, 1953 |
| 2,833,873 | Jansen | May 6, 1958 |